United States Patent

Lee et al.

[15] 3,663,265

[45] May 16, 1972

[54] DEPOSITION OF POLYMERIC COATINGS UTILIZING ELECTRICAL EXCITATION

[72] Inventors: Stuart M. Lee; William A. Bailey, both of Orange Co., Calif.

[73] Assignee: North American Rockwell Corporation

[22] Filed: Nov. 16, 1970

[21] Appl. No.: 89,969

[52] U.S. Cl. ..............117/93.1 GD, 117/161 P, 117/161 UF, 117/106 R

[51] Int. Cl. ..............B44d 1/44

[58] Field of Search ..............117/93.1 GD, 93.1 CD, 106 R, 117/161; 204/165, 168, 169

[56] References Cited

UNITED STATES PATENTS 3,310,424 3/1967 Wehner et al. ..............117/106 R
3,379,803 4/1968 Tittmann et al. ..............117/106 R
3,406,040 10/1968 Da Silva et al. ..............117/106 R
3,415,986 12/1968 Shepard ..............204/165 X
3,419,487 12/1968 Robbins et al. ..............117/93.1 GD

*Primary Examiner*—Alfred L. Leavitt
*Assistant Examiner*—J. H. Newsome
*Attorney*—L. Lee Humphries, H. Fredrick Hamann and Martin E. Gerry

[57] ABSTRACT

An electric deposition process providing a glow discharge by virtue of electrical energy fields provided internal to a deposition chamber enables with one step to provide a protective coating of a surface of a substrate material by repolymerizing a polymer solid starting material. A carrier gas such as argon, xenon or krypton is used in the deposition chamber for the energy field to act upon it, provide the glow and cause the glowing gas to volatilize particles of the starting material and be deposited as the protective coating on the substrate.

2 Claims, 1 Drawing Figure

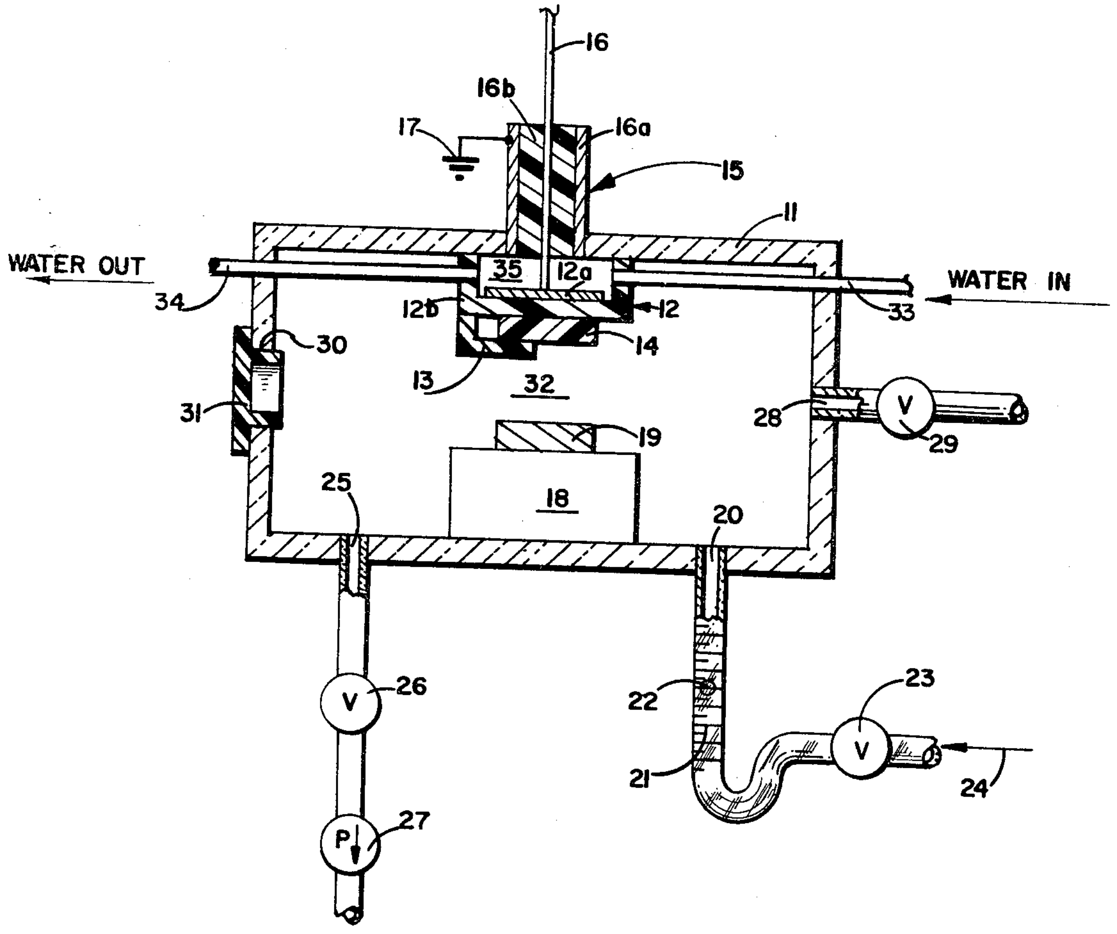
INVENTORS
STUART M. LEE
WILLIAM A. BAILEY
BY Martin E. Gerry
AGENT

DEPOSITION OF POLYMERIC COATINGS UTILIZING ELECTRICAL EXCITATION

BACKGROUND OF THE INVENTION

The invention is in the field of a process and an apparatus therefor for depositing a film on a substrate by the use of electric or glow discharge principle. Certain prior art most close related is hereinafter described as follows:

U.S. Pat. No. 3,462,335 to Hansen utilizes a glow discharge apparatus only for roughening or preparing a surface of one of two materials to be adhesively bonded to each other. However, in this process only one of the two materials is subjected to the glow discharge occurring by introduction of the apparatus of a helium and hydrogen gas mixture. It is then removed from the apparatus and a bonding material is applied to the prepared surface and the other material attached to the material which has the bonding material applied thereto.

U.S. Pat. No. 3,475,307 to Knox utilizes a glow discharge apparatus in which is situated a material to be coated. However, the coating is accomplished by introducing a gaseous hydrocarbon monomer therein. Also the glow discharge apparatus utilizes electrodes therein with a high voltage applied thereto. Additionally, no carrier gas is used for conducting the monomer and for maintaining the glow discharge.

U.S. Pat. No. 3,310,424 to Wehner utilizes a glow discharge apparatus for providing a coating on a substrate surface. However, the coating starting material is a liquid, and the liquid used is a silicone. Also, the apparatus uses electrodes therein to effect a discharge therebetween, and is dependent upon a starting igniter in a mercury pool within the apparatus.

U.S. Pat. No. 3,457,156 to Fisher utilizes a glow discharge apparatus for providing a polyacetylene coating on a substrate. The apparatus has electrodes therein and an acetylene gaseous starting material is injected into the apparatus to be ignited by the apparatus. No carrier gas is used to facilitate glow discharge activity.

U.S. Pat. No. 3,406,040 to Da Silva utilizes an apparatus having an electron beam structure therein. The starting material is a non-volatile evaporant which is evaporated by heating in a stream and subjected to the electron beam which causes the stream of evaporated material to be formed as a coating on the substrate positioned in the apparatus.

U.S. Pat. No. 3,449,154 to Katz utilizes a glow discharge apparatus having electrodes therein to create the electrical discharge therebetween, for providing a coating on a substrate. However, the starting material is a liquid which is vaporized into a gas for vapor deposition on the surface of the substrate. The starting materials are lactams and lactones in liquid form.

U.S. Pat. No. 3,318,790 to Carbajal shows an electric discharge apparatus embodying the principle of the vacuum tube. An electric arc is created between a cathode and an anode, and the perforated cathode permits electrons, or part of the arc to pass therethrough and impinge on the surface of the substrate in the apparatus. Simultaneously, a starting material in the form of an organic gaseous source material is injected into the apparatus upon which the arc portions passing through the cathode acts upon for deposition of a film on the substrate.

U.S. Pat. No. 3,472,679 to Ing shows an apparatus used for deposition of starting material as a film on a substrate. The starting material is an unpolymerized solid consisting of selenium, arsenic, tellurium, antimony, bismuth, thallium, sulphur and mixtures thereof. Also usable are halogens such as chlorine and iodine plasmas in connection with the starting materials. A plasma is created by ignition of a carrier gas in the vicinity of the substrate, and the starting material is vaporized depositing as a film on the substrate.

U.S. Pat. No. 3,069,283 to Coleman provides in-part a method utilizing an evacuated apparatus and an electric discharge principle for providing a polymerized coating on a substrate. However, there, the starting material used to provide the coating is a gaseous monomer supplied by an external tank into the apparatus.

U.S. Pat. No. 3,068,510 to Coleman provides in-part a method utilizing an evacuated apparatus and means for producing electric discharge in the apparatus to provide a polymerized coating on a substrate having an electrically conductive surface. Power is provided for polymerization of the gaseous material, which is contained in an external tank. The substrate to be coated being conductive is part of the electrical circuit to which the power source is connected. The gaseous material introduced into the apparatus provides the medium through which an electric discharge occurs, depositing the gaseous starting material previously introduced into the apparatus on the electrically conductive substrate.

INVENTION SUMMARY

Briefly, according to the invention, an electric deposition process is utilized to provide an organic coating on a substrate material. The process uses a polymerized starting material positioned, with respect to a substrate material which surfaces are desired to be coated, in an evacuated chamber into which a carrier gas of argon, krypton or xenon, or mixtures thereof are injected into the chamber. The chamber is provided with means for electrically exciting the carrier gas, and setting up a glow therein of the carrier gas. The starting material is bombarded with the electrically excited carrier gas which volatilizes portions of the polymerized starting material which passes into the glow zone. This action causes deposition of the volatilized material on the surface of the substrate material forming a repolymerized coating of the polymerized starting material on such substrate surface.

Therefore, an objective of this invention is to utilize expensive, already polymerized coating material which normally would have to be thrown away as waste, as well as use other solid polymers as may be available to provide a good protective coating to delicate surfaces such as solid state circuits or the like.

Hence, another object is to overcome the disadvantages of the prior art, which is mainly possible by utilization of radio frequency energy creating a glow of the inert carrier gas used in the process acting on the solid polymerized starting material, and not possible by any other process.

BRIEF DESCRIPTION OF DRAWINGS

The FIGURE is a schematic representation of a processing chamber energizeable with radio frequency energy, evacuated, and into which a carrier gas is injected for maintaining a glow discharge to act upon the polymerized solid material in the chamber and to provide the deposition of a repolymerized protective layer on the substrate prepositioned in the chamber.

EXEMPLARY EMBODIMENT

Referring to the FIGURE, chamber 11 made of glass or other insulating material is provided to practice the process.

Radio frequency radiator 12 generally having external surfaces made of, or covered with electrically insulating material such as a ceramic, is attached to the upper surface of the inner chamber wall. Radiator 12 has a holder 13 made of suitable material such as a ceramic for holding in place polymerized solid material 14.

Examples of polymerized solid materials are of the poly-para-xylylene class and includes but is not limited to poly-chloro-para-xylylene and poly-dichloro-para-xylylene. This aforementioned class of poly-para-xylylene, normally is waste material that is very expensive, resulting from the use of dimers including but not limited to para-xylylene or chloro-para-xylylene or dichloro-para-xylylene in a vapor deposition process for obtaining polymerized poly-para-xylylene coatings on substrates. Thus the polymerized solid starting materials contemplated include repolymerized materials of the above xylylene class stated. The waste material above mentioned, and reusable in this process, is obtained by removing it from the walls of the processing chamber wherein previously used, thus effecting large economies.

Other examples of polymerized starting materials usable in this process are fluorocarbons such as polytetrafluoroethylene or fluorinated ethylene propylene. Other classes are chlorofluorohydrocarbons such as polychlorotrifluoroethylene. Still another class is fluorohydrocarbons such as polyvinylidene fluoride, polyvinyl fluoride, or copolymers of halogenated and fluorinated ethylenes.

Other groups of polymerized solid starting materials include polyamides, polyimides, polycarbonates, polyphenylene oxides or hydrocarbons such as polyethylene.

One advantage of placing material 14 near radiator 12 is to enable greater efficiency in transmitting or saturating the material with radio frequency energy. The carrier gas injected in chamber 11 is excited by the radio frequency energy emanating from radiator 12, sets up a field in the chamber generally resulting in a glow due to excitation of the gas between the radiator and the substrate material to be hereinafter described.

To achieve the radio frequency energy field, one end of a coaxial cable 15 is connected to the input of radiator member 12, by connecting center conductor 16 to metallic radiator element 12*a*, insulation holder 12*b* electrically insulates element 12*a* from the starting material 14, and outer conductor shield 16*a* which is part of cable 15 is grounded as at 17. The other end of center conductor 16 and outer conductor shield 16*a*, which is grounded at 17, is connected to the radio frequency power source (not shown). Insulator 16*b* electrically insulates shield center conductor 16 from shield 16*a*.

The chamber is provided internally with a pedestal 18 on which the substrate material 19 desired to be coated is positioned.

The chamber is provided with a port at 20 to which is attached one end of flowmeter 21. The flowmeter is calibrated to measure flow rates of carrier gas by means a floating ball 22 internally thereto. The higher the floating ball rises by virtue of carrier gas passage through the flowmeter, the greater the flow rate of the carrier gas.

Flow regulating valve 23 is attached to the other end of flowmeter 21 for controlling the flow rate of carrier gases injected therein as diagramatically indicated by arrow 24. Carrier gases normally used in this process may include argon, krypton and/or xenon, and are injected at the rate of 300 cc/min. during the process.

Port 25 is provided in the chamber for attaching one end of a vacuum control valve 26 for regulating speed of evacuation of the chamber or for completely shutting off the evacuation of the chamber.

Pump 27 is attached to the other end of valve 26, and is used to maintain the desired amount of vacuum. Typical vacuum range has between 0.01–0.03 millimeters of mercury.

Port 28 is provided in the chamber for attaching bleed valve 29 thereto which is closed during deposition cycle of the process and is opened at completion of the deposition cycle to release the vacuum in the chamber.

Port 30 is provided in the chamber for both loading the starting material and the substrate into the chamber at the beginning of the process, and is also used to remove the substrate material at the end of the process and also any unused portion of the starting material. Door 31 is a vacuum tight cover preventing leakage during the process and is opened after release of vacuum. Naturally, it is opened in order to load the chamber with the starting and substrate materials.

Water inlet is provided at input of pipe 33 for circulating water over the surface element 12*a* so as to cool same since about 300 watts of electrical power will be supplied from the RF power supply, and pipe 34 is provided for dumping the water after circulating in cavity 35 of radiator member 12 between the glass chamber 11, member 12*a* and insulation holder 12*b*.

Typical experimental examples including parameters used, successfully accomplishing the objectives of this process, are given in the following table, but are not limited to the examples shown in such table:

| Polymerized solid starting material | Temperatures, ° C. | | Pressure in millimeter of mercury to maintain glow of carrier gas | Inert carrier gas used |
|---|---|---|---|---|
| | Radiator | Substrate | | |
| Dichloro-poly para-xylylene. | 50 | 50 | .01 | Argon. |
| Do | 60 | 60 | .01 | Do. |
| Poly-tetrafluoro-ethylene. | 75 | 75 | .02 | Xenon. |
| Polyimide | 50 | 35 | .01 | Krypton. |
| Polyamide | 75 | 50 | .01 | Argon. |
| Polyethylene | 65 | 25 | .03 | Krypton. |

Hence, in the experimental examples stated above, with substrate and starting materials in place, door 31 closed, valve 29 closed valve 26 open, pump 27 in operation evacuating the chamber to the required pressure as given in the table in order to maintain the glow, power supplied to terminals 16–17 and water is supplied to pipe 33, valve 23 is opened to allow carrier gas 24 to be injected in the chamber and adjusted to provide maximum glow of the RF excited carrier gas.

The excited carrier gas, now glowing, bombards the polymerized starting material 14, knocking out or volatilizing the molecules of material 14 into glow zone 32 and results in a repolymerized coating on such surfaces of substrate which are exposed.

We claim:

1. An electric deposition process for providing an organic coating on a substrate material, said process utilizing an organic polymerized starting material, which has been polymerized beyond the dimer state, preselectably positioned with respect to said substrate material in an evacuated chamber into which an inert carrier gas selected from the group of at least one gas consisting of argon, krypton and xenon injected into the chamber, said chamber being provided with means for electrically exciting said carrier gas therein, the improvement comprising:

bombarding said polymerized starting material with the excited carrier gas thereby volatilizing portions of said starting polymerized material which pass into the glow zone of the chamber thereby depositing the volatilized material on a surface of said substrate material in the form of a repolymerized coating of said polymerized starting material, the organic polymerized starting material being at least one polymer selected from the class consisting of poly-para-xylylenes, fluorocarbons, polyimides, polyamides, hydrocarbons, fluorohydrocarbons, chlorofluorohydracarbons, copolymers of halogenated or fluorinated ethylenes, polycarbonates, and polyphenylene oxides.

2. The invention as stated in claim 1: the organic starting material being at least one polymer selected from the class consisting of dichoro-poly-para-xylylene, polytetrafluoroethylene, polyethylene, fluorinated ethylene propylene, polychlorotrifluoroethylene, polychlorotrifluoroethylene, polyvinylidene fluoride, and polyvinyl fluoride.

* * * * *